(12) United States Patent
Kaltenbach et al.

(10) Patent No.: US 11,345,227 B2
(45) Date of Patent: May 31, 2022

(54) TRANSMISSION AND DRIVE SYSTEM OF A MOTOR VEHICLE

(71) Applicant: ZF Friedrichshafen AG, Friedrichshafen (DE)

(72) Inventors: Johannes Kaltenbach, Friedrichshafen (DE); Matthias Horn, Tettnang (DE); Uwe Griesmeier, Markdorf (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 17/286,296

(22) PCT Filed: Sep. 16, 2019

(86) PCT No.: PCT/EP2019/074633
§ 371 (c)(1),
(2) Date: Apr. 16, 2021

(87) PCT Pub. No.: WO2020/078628
PCT Pub. Date: Apr. 23, 2020

(65) Prior Publication Data
US 2021/0339619 A1 Nov. 4, 2021

(30) Foreign Application Priority Data

Oct. 18, 2018 (DE) ...................... 10 2018 217 854.2

(51) Int. Cl.
*B60K 6/44* (2007.10)
*B60K 6/365* (2007.10)
(Continued)

(52) U.S. Cl.
CPC ................ *B60K 6/44* (2013.01); *B60K 6/365* (2013.01); *B60K 6/547* (2013.01); *B60K 6/387* (2013.01); *B60Y 2200/92* (2013.01)

(58) Field of Classification Search
None
See application file for complete search history.

(56) References Cited

U.S. PATENT DOCUMENTS 9,586,470 B2 * 3/2017 Park ........................ F16H 59/44
2010/0009805 A1 1/2010 Bachmann
(Continued)

FOREIGN PATENT DOCUMENTS

DE 102005048938 A1 4/2007
DE 102006059591 A1 6/2008
(Continued)

OTHER PUBLICATIONS

International Search Report (English Translation) PCT/EP2019/074633, dated Dec. 12, 2019. (2 pages).

*Primary Examiner* — Dirk Wright
(74) *Attorney, Agent, or Firm* — Dority & Manning, P.A.

(57) ABSTRACT

A transmission (2) includes a first input shaft (7) for a first prime mover (3), a second input shaft (8) for a second prime mover (4), as well as a first output shaft (9) and a second output shaft (10), which are each coupleable to a drive output (11). A first sub-transmission (5) includes the first input shaft (7), and fixed gears (12, 13) are arranged on the first input shaft (7). Each of these fixed gears (12, 13) meshes with a respective idler gear (14, 15) on the first output shaft (9) and with a respective idler gear (16, 17) on the second output shaft (10). Shift elements (A, B, C, D) are associated with the output shafts (9, 10), depending on which the idler gears of the output shafts are coupleable to the particular output shaft in a rotationally fixed manner. A second sub-transmission (6) includes the second input shaft (8) and is designed as a planetary transmission. A ring gear (22) forms the second input shaft (8). A carrier (23) is coupled to one of the output shafts (9, 10). Shift elements (F, E) are associated with the planetary transmission, via which, (Continued)

depending on their shift position, the sun gear (24) is fixedly connectable to the housing or the planetary transmission is bringable into direct drive. The planetary transmission is arranged coaxially to the first input shaft (7). The carrier (23) of the planetary transmission is permanently coupled to one of the output shafts via a spur gear stage.

9 Claims, 8 Drawing Sheets

(51) Int. Cl.
    *B60K 6/547*     (2007.10)
    *B60K 6/387*     (2007.10)

(56) References Cited

U.S. PATENT DOCUMENTS

| | | |
|---|---|---|
| 2012/0035013 A1 | 2/2012 | Appeltauer |
| 2015/0352942 A1 | 12/2015 | Kaltenbach et al. |
| 2016/0176280 A1 | 6/2016 | Kaltenbach et al. |

FOREIGN PATENT DOCUMENTS

| | | | |
|---|---|---|---|
| DE | 102009010065 A1 | 8/2010 | |
| DE | 102013215114 A1 | 2/2015 | |
| DE | 102015221499 A1 * | 5/2017 | ............ F16H 3/095 |
| WO | WO 2007/042109 | 4/2007 | |
| WO | WO 2008/074614 | 6/2008 | |
| WO | WO 2010/094389 | 8/2010 | |
| WO | WO 2014075854 A1 | 5/2014 | |

\* cited by examiner

Shift Conditions with Exemplary Ratio Values

| Condition | Gear ICE | i_ICE | phi ICE | Gear EM1 | i_EM1 | A | B | C | D | E | F | Note |
|---|---|---|---|---|---|---|---|---|---|---|---|---|
| 1 | 1 | 8.12 | 1.45 | 1 | 10.35 | x | | | | x | | Hybrid Mode |
| 2 | 2 | 5.60 | 1.45 | 1 | 10.35 | | x | | | x | | Hybrid Mode |
| 3 | 3 | 3.85 | 1.45 | 1 | 10.35 | | | x | | x | | Hybrid Mode |
| 4 | 4 | 2.66 | | 1 | 10.35 | | | | x | x | | Hybrid Mode |
| 5 | 1 | 8.12 | | 2 | 6.55 | x | | | | | x | Hybrid Mode |
| 6 | 2 | 5.60 | | 2 | 6.55 | | x | | | | x | Hybrid Mode |
| 7 | 3 | 3.85 | | 2 | 6.55 | | | x | | | x | Hybrid Mode |
| 8 | 4 | 2.66 | | 2 | 6.55 | | | | x | | x | Hybrid Mode |
| 9 | 0 | | | 1 | 10.35 | | | | | x | | Purely Electric |
| 10 | 0 | | | 2 | 6.55 | | | | | | x | Purely Electric |
| 11 | 1 | 8.12 | | 0 | | x | | | | | | Purely Internal Combustion Engine-driven |
| 12 | 2 | 5.60 | | 0 | | | x | | | | | Purely Internal Combustion Engine-driven |
| 13 | 3 | 3.85 | | 0 | | | | x | | | | Purely Internal Combustion Engine-driven |
| 14 | 4 | 2.66 | | 0 | | | | | x | | | Purely Internal Combustion Engine-driven |

Gear 0 Means Neutral

Exemplary Ratio Values

| Gear Stage | i | Effective Direction |
|---|---|---|
| i_ab1 | 3.50 | Output Shaft 1 to Differential |
| i_ab2 | 2.41 | Output Shaft 2 to Differential |
| i0 | -1.72 | Stationary Transmission Ratio Planetary Gear Set |
| i1 | 2.32 | Input Shaft to Output Shaft 1 |
| i2 | 2.32 | Input Shaft to Output Shaft 2 |
| i3 | 1.10 | Input Shaft to Output Shaft 1 |
| i4 | 1.10 | Input Shaft to Output Shaft 2 |
| ic | 1.87 | Carrier of Planetary Gear Set to Output Shaft 1 |

Fig. 2

TRANSMISSION AND DRIVE SYSTEM OF A MOTOR VEHICLE

CROSS-REFERENCE TO RELATED APPLICATIONS

The present application is related and has right of priority to German Patent Application No. 102018217854.2 filed in the German Patent Office on Oct. 18, 2018 and is a nationalization of PCT/EP2019/074633 filed in the European Patent Office on Sep. 16, 2019, both of which are incorporated by reference in their entirety for all purposes.

FIELD OF THE INVENTION

The invention relates generally to a transmission of a motor vehicle. In addition, the invention relates generally to a transmission system of a motor vehicle.

BACKGROUND

DE 10 2013 215 114 A1 describes a hybrid drive of a motor vehicle with a transmission, a first prime mover designed as an internal combustion engine, a second prime mover designed as an electric machine, and a drive output including a differential. The transmission includes a first input shaft, to which the first prime mover, designed as an internal combustion engine, is coupleable. In addition, the transmission includes a second input shaft, to which the prime mover designed as the electric machine is coupleable. The transmission also includes two output shafts, which are both coupled to the drive output and, thereby, are operatively connected. Two fixed gears are arranged on the first input shaft, to which the first prime mover, designed as an internal combustion engine, is coupleable. Each of these fixed gears meshes into an idler gear of the first output shaft and, in addition, into an idler gear of the second output shaft. The spur gear stages formed as a result are part of a first sub-transmission of the transmission. The transmission from DE 10 2013 215 114 A1 also includes a second sub-transmission, which includes a planetary transmission with a ring gear, a sun gear, and a carrier. The ring gear of the planetary transmission forms the second input shaft of the transmission. The carrier of the planetary transmission is coupled to one of the output shafts. Shift elements are associated with the two output shafts, depending on which the idler gears of the output shafts are coupleable to the particular output shaft in a rotationally fixed manner. Shift elements are also associated with the planetary transmission of the second sub-transmission, depending on which the sun gear of the planetary transmission is either fixedly connectable to the housing or depending on which the planetary transmission can be brought into a direct drive.

According to DE 10 2013 215 114 A1, the planetary transmission is arranged coaxially to one of the output shafts. As a result, a large installation space requirement is necessary in the axial direction.

BRIEF SUMMARY OF THE INVENTION

Example aspects of the invention provide a new type of transmission of a motor vehicle and a transmission system with a transmission of this type.

According to example aspects of the invention, the planetary transmission is arranged coaxially to the first input shaft. The carrier of the planetary transmission is permanently coupled to one of the output shafts via a spur gear stage.

In the transmission according to example aspects of the invention, the planetary transmission is arranged coaxially to the first input shaft. The carrier of the planetary transmission is permanently coupled to one of the output shafts via a spur gear stage. In the transmission according to example aspects of the invention, both output shafts can be designed to be relatively short, and so the transmission takes up less installation space overall. Since the most installation space in the axial direction is available on the first input shaft, to which the first prime mover, preferably designed as an internal combustion engine, is coupleable, the planetary transmission with the associated shift elements can be particularly advantageously positioned coaxially to the first input shaft. Despite a compact design, a plurality of shift conditions and, therefore, operating modes, is implementable, namely an electric mode, a purely internal combustion engine-driven mode, and a hybrid mode.

According to one advantageous example refinement, the carrier of the planetary transmission is permanently coupled to a fixed gear of one of the output shafts via an idler gear of the first input shaft. This allows for a particularly compact design of the transmission.

According to one advantageous example refinement, a further shift element is associated with the planetary transmission, via which, depending on the shift position, a speed superimposition mode is settable at the planetary transmission for the first prime mover and the second prime mover, in which the first prime mover is coupled to the sun gear of the planetary transmission, the second prime mover is coupled to the ring gear of the planetary transmission, and the carrier of the planetary transmission is coupled to the output shaft.

For the case in which the further shift element for the planetary transmission is present, a speed superimposition mode at the planetary gear set can be provided for the two prime movers for the case in which all other shift elements are disengaged. Thereupon, a starting operation in the electrodynamic starting operation (EDA) operating mode is also possible when the energy accumulator is depleted or dead.

According to one advantageous example refinement, a third prime mover is provided, which is designed as an electric machine, wherein the third prime mover is operatively connected to the first input shaft. For the case in which the third prime mover, designed as an electric machine, is present, the operation of the transmission and/or of the transmission system including the transmission can be further improved. The electric machine of the third prime mover can operate, in particular, as a starter generator and allow for a serial operation.

According to one advantageous example refinement, a separating clutch for the decoupleable connection of the first prime mover to the first input shaft is associated with the first input shaft. It is particularly preferred when the separating clutch is connected between the input shaft and the internal combustion engine. When the separating clutch is disengaged, purely electric powershifts and a purely electric starting operation in the EDA operating mode can be utilized and/or made available when the two electric machines of the second prime mover and the third prime mover are present.

BRIEF DESCRIPTION OF THE DRAWINGS

Exemplary embodiments of the invention are explained in greater detail with reference to the drawings, without being limited thereto, in which:

FIG. 2 shows a shift pattern of the example transmission system from FIG. 1;

DETAILED DESCRIPTION

Figure 1:
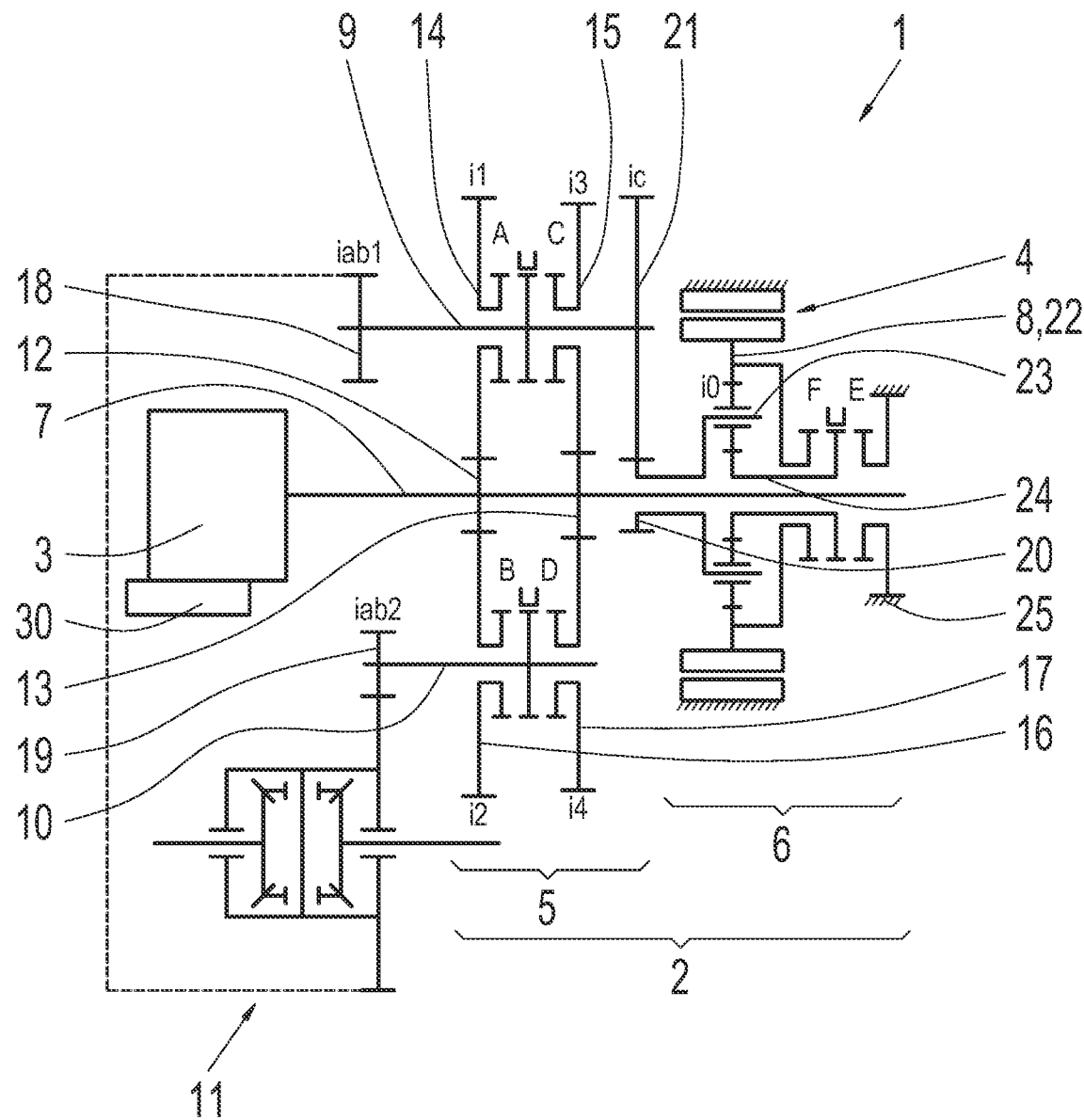
FIG. 1 shows a diagram of a transmission system of a motor vehicle with a first exemplary embodiment of a transmission.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a first exemplary embodiment of a transmission system 1 with a transmission 2 according to example aspects of the invention. The transmission system 1 according to example aspects of the invention with the transmission 2 according to example aspects of the invention includes a first prime mover 3 and a second prime mover 4, wherein the first prime mover 3 is preferably designed as an internal combustion engine and the second prime mover 4 is preferably designed as an electric machine. The electric machine and/or the second prime mover 4 are/is preferably an integral part of the transmission 2.

The transmission 2 includes two sub-transmissions 5 and 6. Moreover, the transmission 2 according to example aspects of the invention includes two input shafts 7 and 8. The first input shaft 7 is an integral part of the first sub-transmission 5, wherein, in FIG. 1, the first prime mover 3, designed as an internal combustion engine, is permanently coupled to the first input shaft 7. The second sub-transmission 6 includes the second input shaft 8. In FIG. 1, the second prime mover 4, designed as an electric machine, is permanently coupled to the second input shaft 8 and, in fact, directly and/or immediately.

The transmission 2 includes, in addition to the two sub-transmissions 5, 6 with the two input shafts 7, 8, two output shafts 9, 10, which are both operatively connected to a drive output 11 and/or coupled to the drive output 11. With respect to the drive output 11, a differential is shown.

Fixed gears 12, 13 are positioned and/or arranged in a rotationally fixed manner on the first input shaft 7. Each of these fixed gears 12, 13 of the first input shaft 7 meshes into an idler gear of each of the two output shafts 9, 10. Idler gears 14, 15 are mounted on the output shaft 9 and idler gears 16, 17 are mounted on the output shaft 10. The fixed gear 12 of the first input shaft 7 meshes into the idler gear 14 of the output shaft 9 and into the idler gear 16 of the output shaft 10 while forming a spur gear plane. The fixed gear 13 of the first input shaft 7 meshes into the idler gear 15 of the first output shaft 9 and into the idler gear 17 of the second output shaft 10 while forming a further spur gear plane. Moreover, fixed gears are arranged on both output shafts 9, 10, namely the fixed gear 18 on the first output shaft 9 and the fixed gear 19 on the second output shaft 10, which both mesh into the drive output 11, namely into the differential of the drive output 11.

Shift elements A, B, C, and D are associated with the first sub-transmission 5, which includes the first input shaft 7 and the aforementioned spur gear planes of the gearwheels 12, 13, 14, 15, 16, and 17. The shift elements A and C are associated with the first output shaft 9 and the shift elements B and D are associated with the second output shaft 10, wherein the two shift elements A and C as well as the two shift elements B and D are formed by one double shift element in each case. Only one of these shift elements of a double shift element can ever be engaged at a time, but not both simultaneously. For the case in which the shift element A of the double shift element of the first output shaft 9 is engaged, the idler gear 14 is coupled to the first output shaft 9 in a rotationally fixed manner. However, for the case in which the shift element C of the double shift element of the first output shaft 9 is engaged, the idler gear 15 is coupled to the first output shaft 9 in a rotationally fixed manner. Comparable conditions apply in the area of the second output shaft 10. For the case in which the shift element B of the double shift element of the second output shaft 10 is engaged, the idler gear 16 is coupled to the second output shaft 10 in a rotationally fixed manner. However, for the case in which the shift element D of the double shift element of the second output shaft 10 is engaged, the idler gear 17 is coupled to the second output shaft 10 in a rotationally fixed manner.

The second sub-transmission 6, which provides the second input shaft 8, to which the second prime mover 4, preferably designed as an electric machine 4, is coupled, includes a planetary transmission with a ring gear 22, a carrier 23, and a sun gear 24.

The ring gear 22 provides the second input shaft of the transmission 2. The carrier 23 is coupleable to the drive output 11, wherein the carrier 23 is permanently coupled to one of the output shafts 9 or 10 and, in fact, in the exemplary embodiment from FIG. 1, to the first output shaft 9 and, in fact, in such a way that the first output shaft 9 supports a further fixed gear 21, which meshes with a gearwheel 20, which is permanently coupled to the carrier 23, wherein this gearwheel 20 is an idler gear of the first input shaft 7. The gearwheels 20, 21 form a spur gear stage, via which the carrier 23 is permanently coupled to the first output shaft 9.

The planetary transmission of the second sub-transmission 6, which is arranged coaxially to the first input shaft 7, also includes the sun gear 24. Moreover, the shift elements F and E are associated with the planetary transmission and are preferably formed by a double shift element, and so only one of these shift elements F and E can be engaged, but never both simultaneously. For the case in which the shift element E is engaged, the sun gear 24 is fixedly connected to the housing, namely to a housing 25 of the transmission 2. However, for the case in which the shift element F is engaged, the transmission is in direct drive and, in fact, in the exemplary embodiment shown, due to the fact that the sun gear 24 is coupled to the ring gear 22. It is also possible to couple the sun gear 24 to the carrier 23 via the shift element F to provide a direct drive.

It is particularly advantageous to couple the carrier 23 to the first input shaft 9, the fixed gear 18 of which has a higher ratio iab1 than the fixed gear 19 of the second output shaft 10. A higher ratio for the second prime mover 4, which is designed as an electric machine, is advantageous, in order to be able to design the same with a higher rotational speed and lower torque.

A plurality of shift conditions and, therefore, operating modes can be implemented with the transmission 2, wherein the shift conditions are summarized in the shift pattern from FIG. 2. A purely electric mode, a purely internal combustion engine-driven mode, and a hybrid mode are possible. Shift elements that are engaged in the particular condition of the shift pattern from FIG. 2 are marked with an X in FIG. 2. The shift pattern from FIG. 2 includes ratios implementable in the individual shift conditions together, by way of example. The ratio values are purely exemplary.

Since, in the transmission 2 according to example aspects of the invention, the planetary transmission of the second sub-transmission 6 is arranged coaxially to the first input shaft 7, to which the first prime mover 3, designed as an internal combustion engine, is coupled, a particularly compact design for the transmission 2 can be implemented. Both output shafts 9, 10 can be designed to be axially short. The most installation space in the axial direction is available on the first input shaft 7, whereby the arrangement of the planetary transmission coaxially to the first input shaft 7 is particularly preferred.

A further advantage related to installation space can be implemented when, as shown in FIG. 1, the second prime mover 4, designed as an electric machine, is arranged coaxially to the first input shaft 7 and, thereby, coaxially to the planetary transmission 3, since the planetary transmission 3 can then be arranged nested in the rotor of the electric machine. Due to the fact that, according to example aspects of the invention, the carrier 23 is permanently coupled to one of the output shafts, namely to the first output shaft 9 in FIG. 1, via a constant gear stage of the gearwheels 20, 21, an additional pre-ratio for the first prime mover 4, designed as an electric machine, can be omitted.

According to FIG. 1, a starter generator 30, which can be designed as a belt-driven starter generator, is associated with the internal combustion engine 3. This is advantageous, since, in the exemplary embodiment from FIG. 1, charging via the second prime mover 4, which is designed as an electric machine, is not possible at a standstill.

Figure 3:
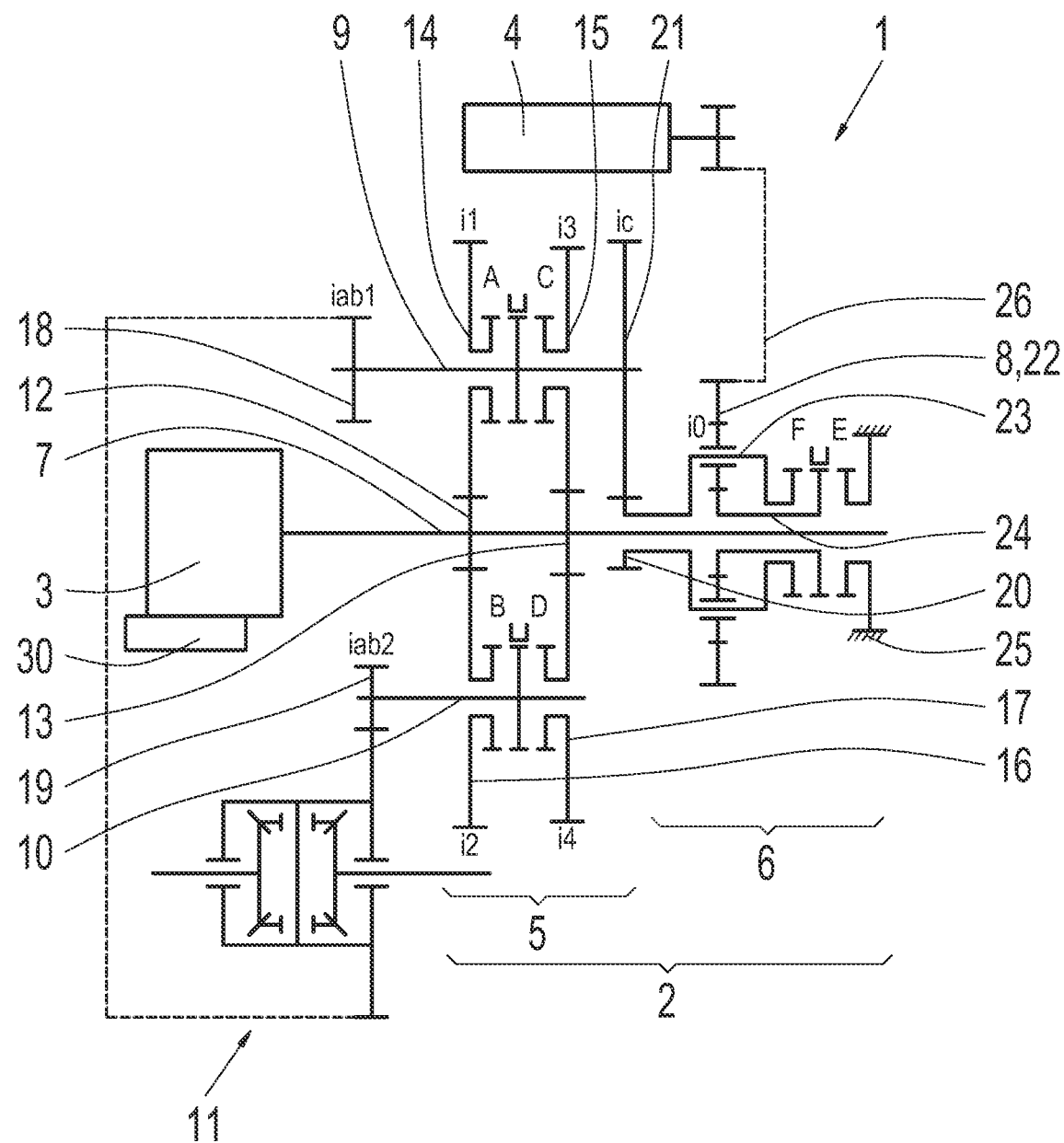
FIG. 3 shows a diagram of a transmission system of a motor vehicle with a second exemplary embodiment of a transmission.

FIG. 3 shows a modification of the exemplary embodiment from FIG. 1, in which the second prime mover 4, designed as an electric machine, is not arranged coaxially to the first input shaft 7, but rather axially parallel thereto, wherein, then, in FIG. 3, the electric machine is coupled via one or multiple spur gear stage(s) 26 or, alternatively, also via a chain to the second input shaft 8 of the transmission 2, which is made available by the ring gear 22 of the planetary transmission. One further difference between the exemplary embodiment from FIG. 3 and the exemplary embodiment from FIG. 1 is that, in FIG. 3, when the shift element F is engaged, the direct drive for the planetary transmission is made available in that the sun gear 24 of the planetary transmission is connected to the carrier 23 thereof.

In the example embodiments from FIGS. 1, 3 and the example embodiment from FIG. 5 to be described further below, it is possible to shorten the first input shaft 7 and, in fact, in such a way that the first input shaft 7 extends only up to the spur gear plane of the gearwheels 13, 15, and 17.

Figure 4:
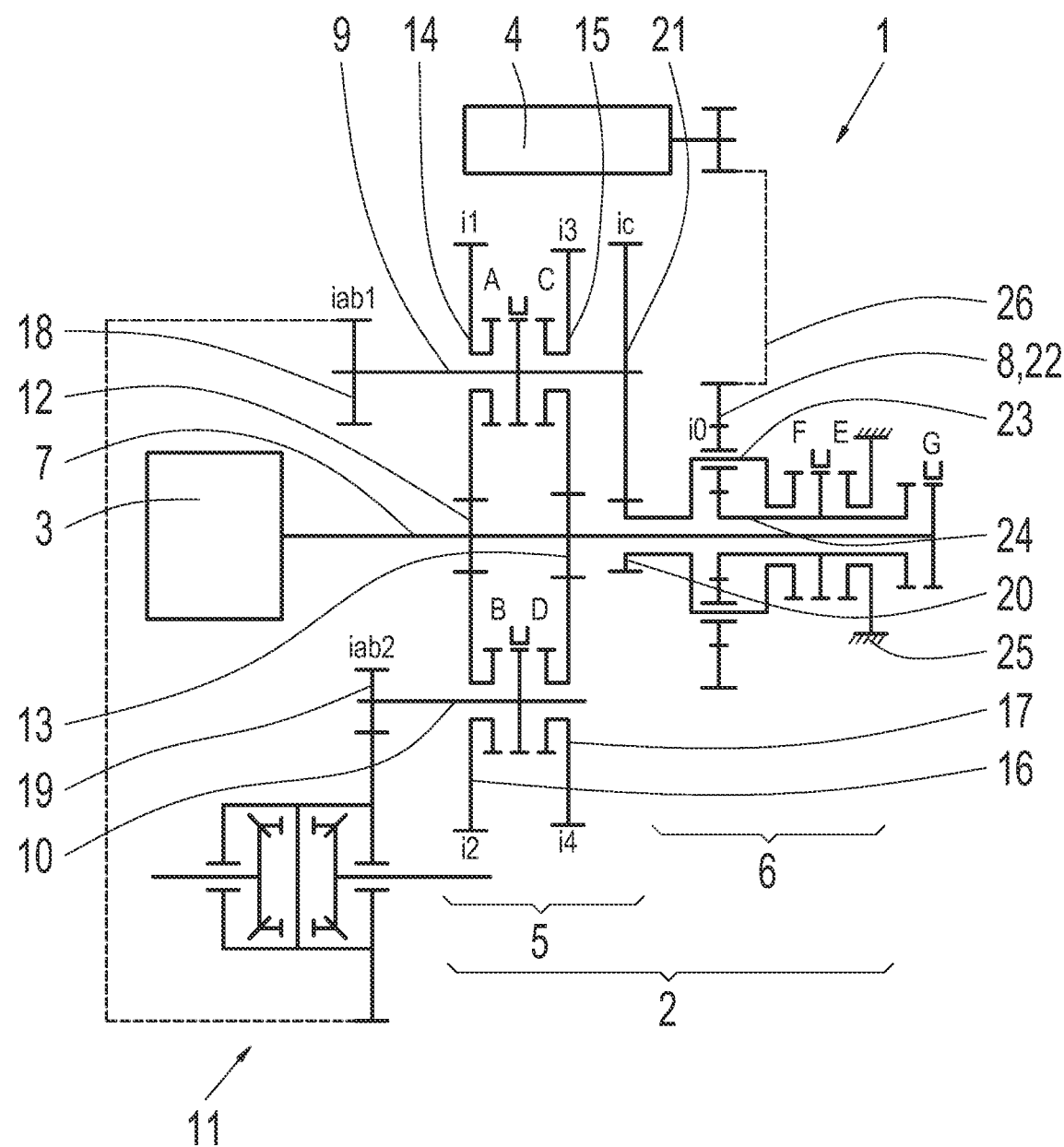
FIG. 4 shows a diagram of a transmission system of a motor vehicle with a third exemplary embodiment of a transmission.

FIG. 4 shows a refinement of the exemplary embodiment from FIG. 3, in which a further shift element G is associated with the planetary transmission and/or the second sub-transmission 6. As a result, an EDA mode can be made available. For the case in which only the shift element G is engaged and all other shift elements A, B, C, D, E, and F are disengaged, a speed superimposition mode can be made available at the planetary transmission for the two prime movers 3, 4, i.e., for the internal combustion engine and the electric machine, in that the internal combustion engine is connected to the sun gear 24, in that the electric machine 4 is coupled to the ring gear 22, and in that the carrier 23 is coupled to the drive output. In the numerical example from FIG. 2, the torque ratio of the internal combustion engine 3 with respect to the differential 11 in the speed superimposition mode is 17.8 and, therefore, is higher than the ratio of the first gear. The EDA operating mode therefore operates in manner that expands the overall gear ratio for the transmission. In the EDA operating mode, a starting operation is possible when the electrical energy accumulator is dead, since the second prime mover 4, which is designed as an electric machine, can operate as a generator when the vehicle is stationary.

Figure 5:
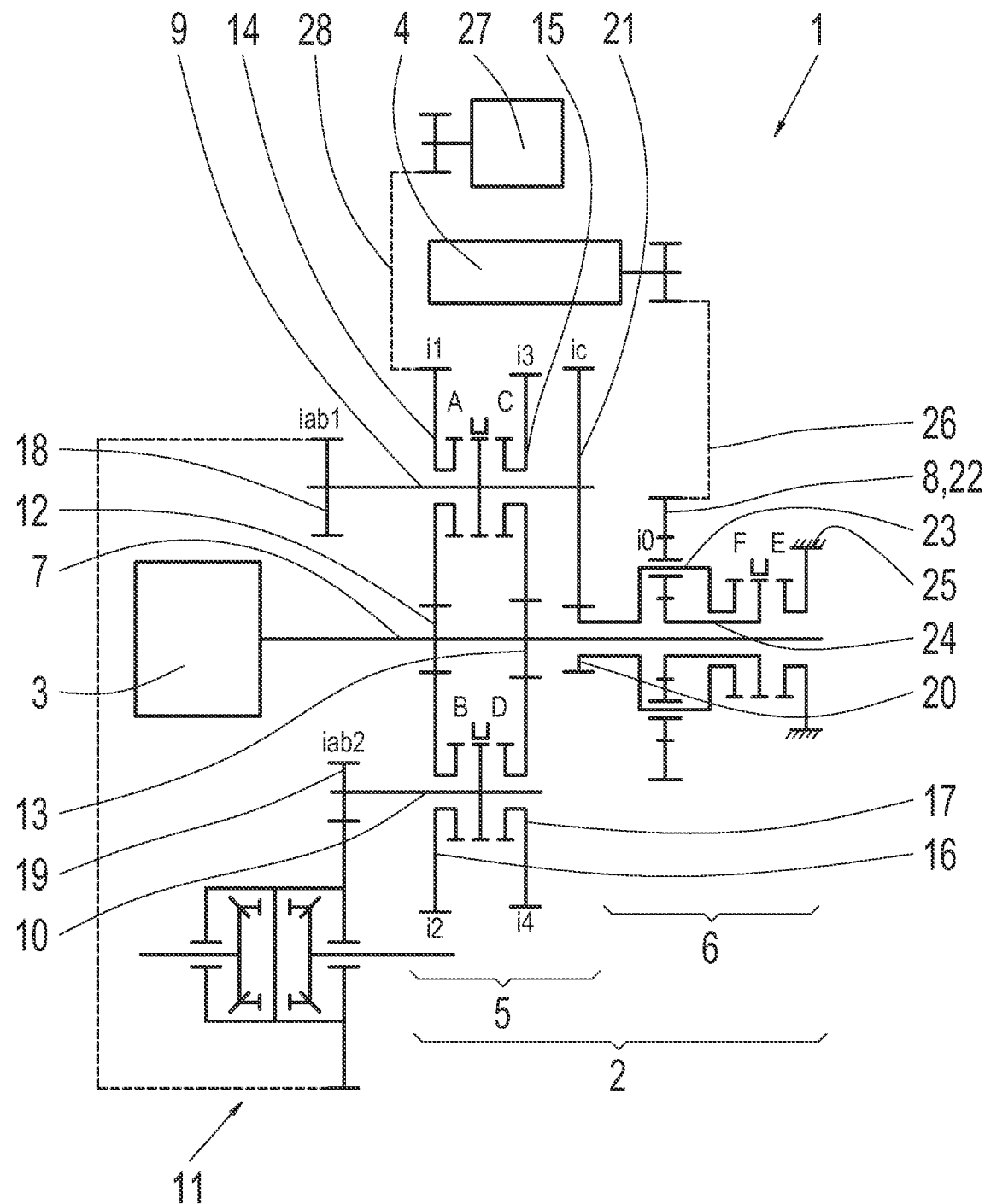
FIG. 5 shows a diagram of a transmission system of a motor vehicle with a fourth exemplary embodiment of a transmission.

The exemplary embodiment from FIG. 5 is also based on the exemplary embodiment from FIG. 3 and differs from the exemplary embodiment from FIG. 3 in that a third prime mover 27 is present, which is designed as an electric machine. The third prime mover 27 can also preferably be an integral part of the transmission 2.

In the exemplary embodiment from FIG. 5, two electric machines are therefore present, which are made available by the prime movers 4 and 27. In FIG. 5, the electric machine 27 of the third prime mover is coupled to the idler gear 14 of the first output shaft 9 via at least one spur gear stage 28. Since the idler gears 14, 15, 16, and 17, which are mounted on the two output shafts 9, 10, are in a fixed speed ratio with the first input shaft 7, the electric machine 27 can be connected, advantageously, to an idler gear of this type. A further planetary gear set, as a pre-ratio, could also act directly at the rotor of the electric machine 27.

Alternatively, the electric machine 27 can also act at one of the existing fixed gears on the first input shaft 7, i.e., at one of the fixed gears 12, 13.

The second electric machine 27 can also be coaxially arranged at the first input shaft 7. Both electric machines 4, 27 can also be arranged coaxially to the first input shaft 7.

The second electric machine, which is made available by the third prime mover 27, can operate as a starter generator, and so a separate starter generator can be omitted in FIG. 5.

Moreover, a serial operation can be made available via the third prime mover 27 and/or the second electric machine, wherein the third prime mover 27 and/or the second electric machine then generate(s) electric current for the second prime mover 4 and/or the first electric machine. This is possible, in particular, in the shift conditions 9 and 10 of the shift pattern from FIG. 2.

Figure 6:
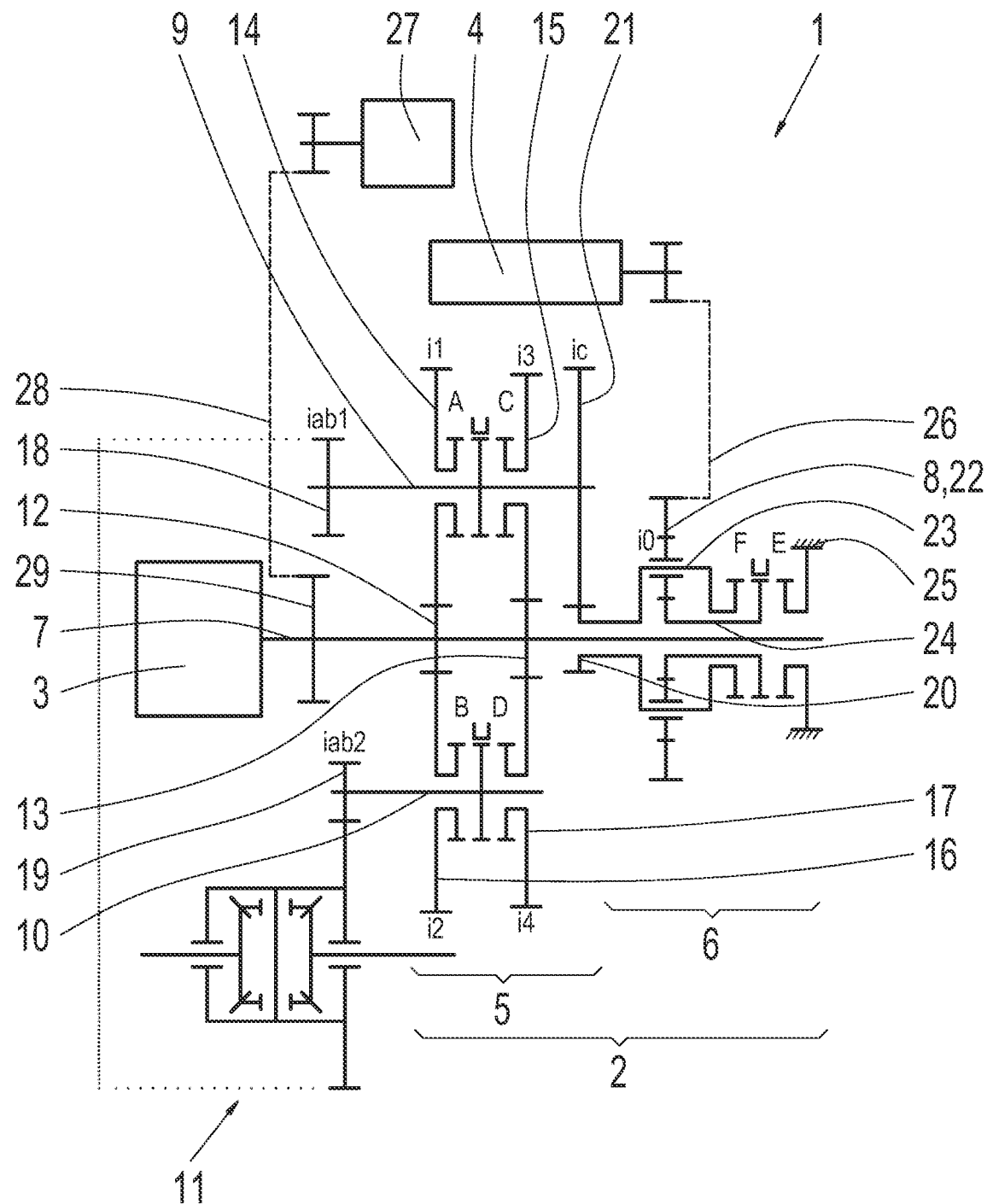
FIG. 6 shows a diagram of a transmission system of a motor vehicle with a fifth exemplary embodiment of a transmission.

FIG. 6 shows a modification of the exemplary embodiment from FIG. 5, in which the third prime mover 27, which is designed as an electric machine, is coupled via a spur gear stage or, alternatively, via a chain to an additional fixed gear 29, which is rotationally fixed to the first input shaft 7.

Figure 7:
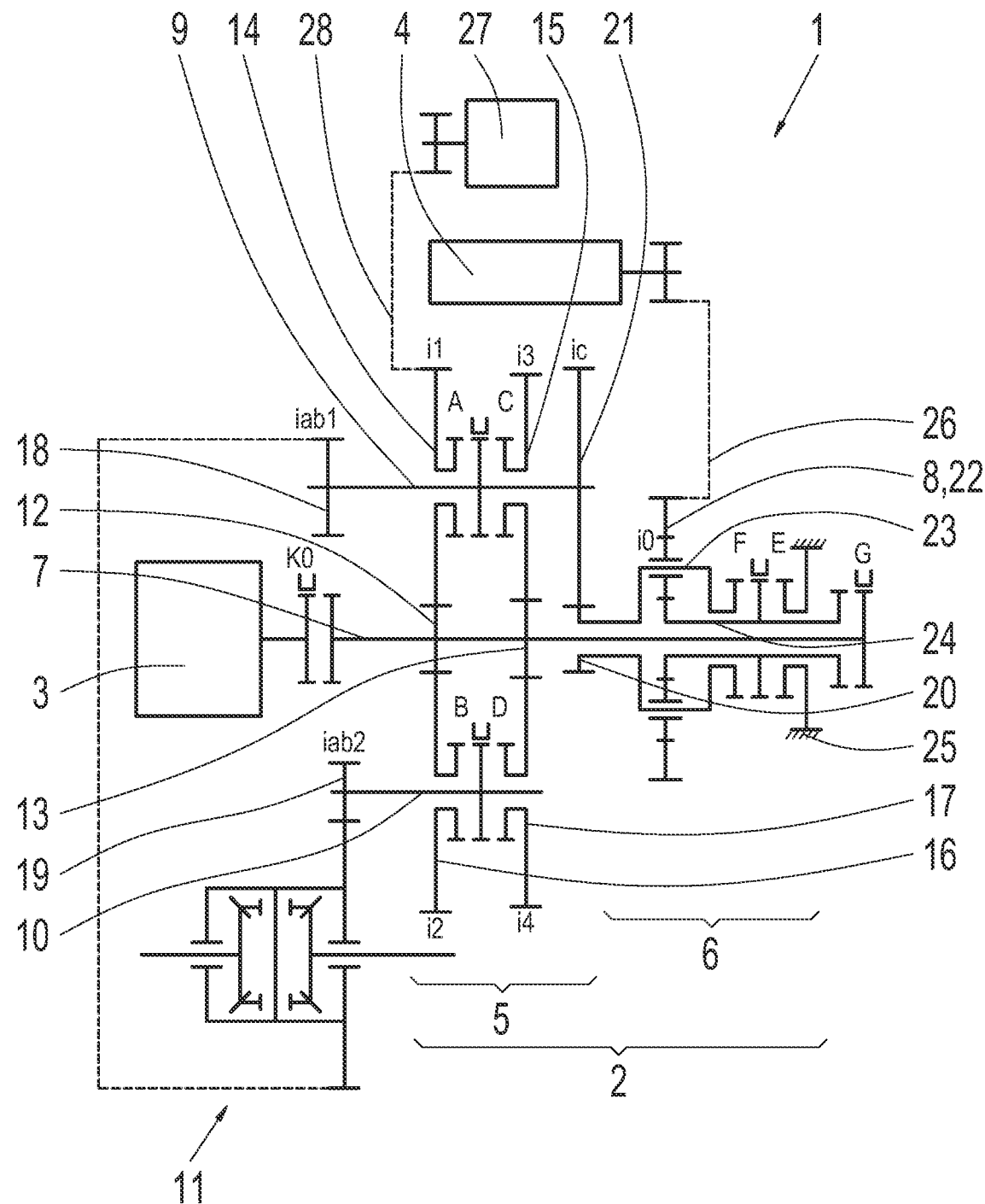
FIG. 7 shows a diagram of a transmission system of a motor vehicle with a sixth exemplary embodiment of a transmission.
Figure 8:
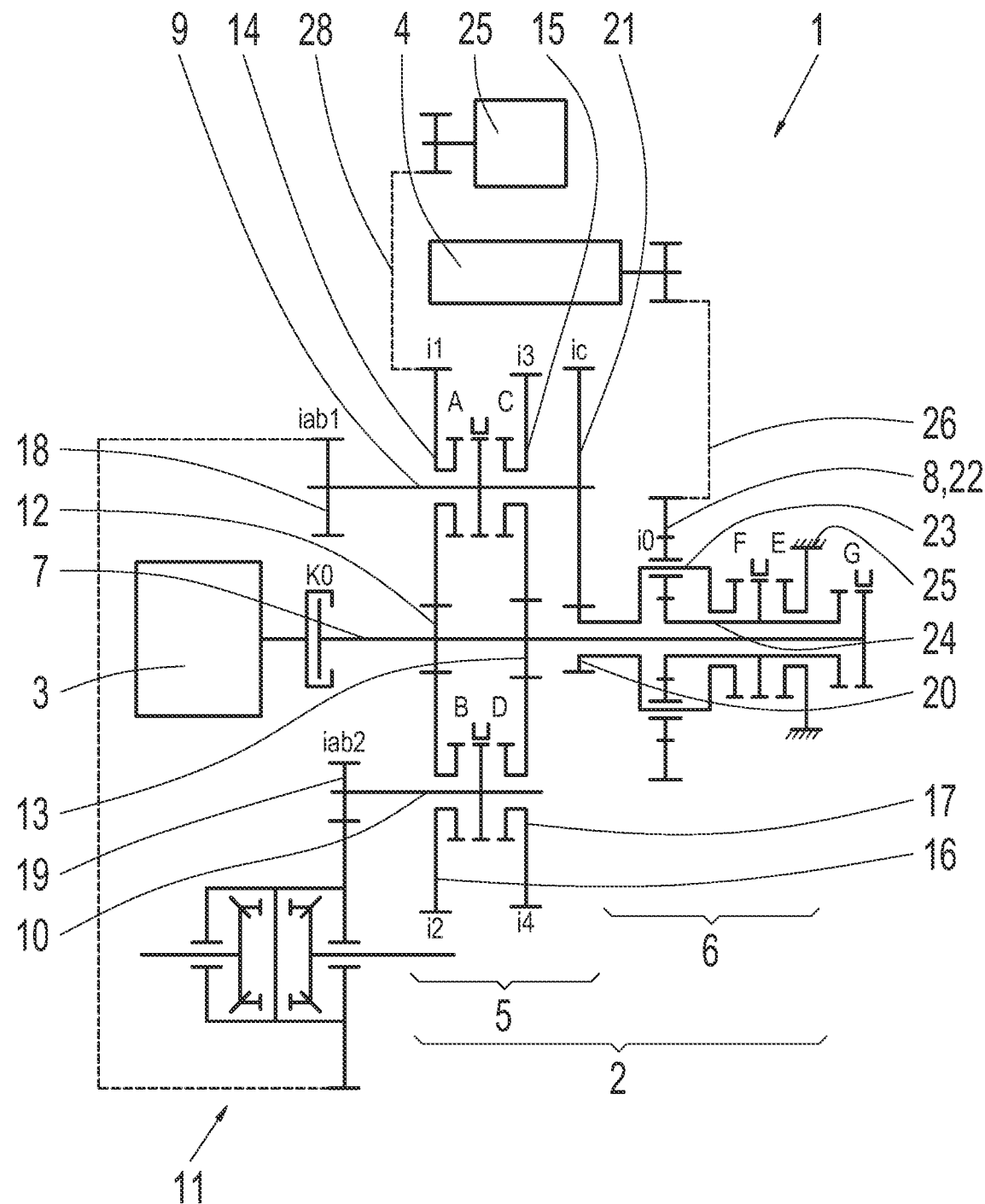
FIG. 8 shows a diagram of a transmission system of a motor vehicle with a further exemplary embodiment of a transmission.

FIGS. 7 and 8 show particularly preferred example embodiments, wherein, in FIGS. 7 and 8, three prime movers 3, 4, and 27 are present, i.e., the internal combustion engine of the first prime mover 3 and the two electric machines of the two prime movers 4 and 27. Moreover, in both exemplary embodiments from FIGS. 7 and 8, the further shift element G is associated with the planetary transmission and/or the second sub-transmission 6. Moreover, a separating clutch KO, which is designed as a form-locking separating clutch in FIG. 7 and as a friction-locking separating clutch in FIG. 8, is connected between the internal combustion engine 3 and the first input shaft 7 in each case.

For the case in which the particular separating clutch KO in the exemplary embodiments from FIGS. 7 and 8 is engaged, an EDA operating mode can be made available, in which only the separating clutch KO and the further shift element G 6 are engaged, but the shift elements A, B, C, D, E, F are disengaged. A power-split traveling mode is then made available, in which all three prime movers 3, 4, 27, i.e., the internal combustion engine and the two electric machines, cooperate. The power-split traveling mode can be utilized for traveling when the electrical energy accumulator is dead and, in fact, also up to higher ground speeds, wherein a changeover into all internal combustion engine-driven gears is possible when one of the shift elements A, B, C, or D is engaged.

In the exemplary embodiments from FIGS. 7 and 8, travel can take place purely electrically when the separating clutch KO is disengaged. In this case, the third prime mover 27, i.e., the electric machine thereof, replaces the internal combustion engine and/or replaces the first prime mover 3. Shift conditions, which are referred to as "hybrid drive" with respect to FIG. 1, then mean a purely electric mode with participation by both electric machines of the two prime movers 4 and 27. The information regarding the internal combustion engine from FIG. 2 then applies for the third prime mover 27, i.e., the second electric machine.

Moreover, in the exemplary embodiment from FIGS. 7 and 8, a purely electric electronic-speed-sensor powershift can be made available when the separating clutch KO is disengaged. In this way, it is possible, starting from the shift condition 9 from FIG. 2 without interruption of tractive force, to enter the shift condition 10 from FIG. 2, i.e., to change over from the first gear for the electric machine 4 into the second gear for the electric machine 4. For this purpose, the second electric machine and/or the third prime mover 27 are/is coupled to the sun gear 24 of the planetary transmission via the shift element G and take(s) over supporting torque for the shift element E. The shift element E is disengaged. Thereafter, the shift element F is synchronized and engaged. In this case, it is advantageous that the electric machine of the prime mover 27 needs less supporting torque and power than the electric machine of the prime mover 4. As a result, the electric machine of the prime mover 27 can be designed to be smaller and more cost-effective.

Moreover, when the separating clutch KO is disengaged, in the drive trains from FIGS. 7 and 8, a starting operation can take place purely electrically in the EDA operating mode, wherein only the shift element G is engaged and all other shift elements A, B, C, D, E, and F are disengaged. In this case, the speed superimposition mode for the two electric machines 4, 27 is present at the planetary transmission. In this way, a starting operation can take place purely electrically, wherein both electric machines of the prime movers 4, 27 can also rotate when the vehicle is stationary. As a result, a standstill derating can be avoided at the two electric machines.

It is possible to actuate the separating clutch KO and the shift element G either via a separate actuator or, alternatively, via a common actuator, wherein, for the case in which the separating clutch KO and the shift element G are actuated via a common actuator, only one thereof can ever be engaged at a time, but never both simultaneously. As a result, an actuator can be saved, but a power-split operation with the separating clutch KO engaged is no longer possible, since the separating clutch KO and the shift element G cannot be simultaneously engaged. A serial operation is still possible when the electrical energy accumulator is dead, however.

As mentioned above, in the exemplary embodiment from FIG. 7, the separating clutch KO is designed as a form-locking, constant-mesh shift element and in FIG. 8 the separating clutch KO is designed as a friction clutch. Exclusively in the exemplary embodiment from FIG. 7, the separating clutch KO and the shift element G can be operated by a common actuator and, in particular, designed as a double shift element.

The application of a friction-locking separating clutch KO according to FIG. 8 is advantageous for making stall protection available for the internal combustion engine of the first prime mover 3. During an emergency braking, the internal combustion engine can be prevented from coming to a standstill, undesirably, by disengaging the separating clutch KO.

The exemplary embodiments described can be arbitrarily combined with one another. For example, in all exemplary embodiments, the electric machine of the second prime mover 4 can be arranged coaxially or axially parallel to the first input shaft 7. In all exemplary embodiments, the electric machine of the third prime mover 27 can also be arranged coaxially or axially parallel to the first input shaft 7. All exemplary embodiments can be designed with or without shift element G and with or without separating clutch KO, wherein the separating clutch KO can be designed, in each case, either as a friction-locking separating clutch or as a form-locking separating clutch. The electric machines 4, 28 can preferably be integral assemblies of the transmission 2.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS 1 transmission system
2 transmission
3 first prime mover/internal combustion engine
4 second prime mover/electric machine
5 first sub-transmission
6 second sub-transmission
7 first input shaft
8 second input shaft
9 first output shaft
10 second output shaft
11 drive output
12 fixed gear
13 fixed gear
14 idler gear
15 idler gear 16 idler gear
17 idler gear
18 fixed gear
19 fixed gear
20 idler gear
21 fixed gear
22 ring gear
23 carrier
24 sun gear
25 housing
26 spur gear stage
27 third prime mover/electric machine
28 spur gear stage
29 fixed gear
30 starter generator
A shift element
B shift element
C shift element
D shift element
E shift element
F shift element
G shift element
KO separating clutch

The invention claimed is:

1. A transmission (2) for a motor vehicle, comprising:
a first input shaft (7) for a first prime mover (3);
a second input shaft (8) for a second prime mover (4);
a first output shaft (9) and a second output shaft (10), each of the first and second output shafts (9, 10) coupleable to a drive output (11);
a first sub-transmission (5) of the transmission (2) includes the first input shaft (7), a plurality of fixed gears (12, 13) are arranged on the first input shaft (7), each of the fixed gears (12, 13) of the first input shaft (7) meshing with a respective idler gear (14, 15) arranged on the first output shaft (9) and with a respective idler gear (16, 17) arranged on the second output shaft (10), each of the idler gears (14, 15, 16, 17) of the first and second output shafts (9, 10) coupleable to an associated one of the first and second output shafts (9, 10) in a rotationally fixed manner via a first plurality of shift elements (A, B, C, D),
a second sub-transmission (6) of the transmission (2) includes the second input shaft (8), the second sub-transmission (6) configured as a planetary transmission with a sun gear (24), a ring gear (22), and a carrier (23), the ring gear (22) forming the second input shaft (8) of the second sub-transmission (6), the carrier (23) coupled to one of the output shafts (9, 10), the sun gear (24) fixedly connectable to the housing or configured to bring the planetary transmission into direct drive via a second plurality of shift elements (F, E),
wherein the planetary transmission is arranged coaxially to the first input shaft (7), and
wherein the carrier (23) of the planetary transmission is permanently coupled to one of the output shafts (9, 10) via a spur gear stage.

2. The transmission of claim 1, wherein the carrier (23) of the planetary transmission is constantly coupled to a fixed gear (21) of one of the output shafts (9, 10) via an idler gear (20) of the first input shaft (7).

3. The transmission of claim 1, wherein the second prime mover (4) is directly coupleable to the second input shaft (8) of the second sub-transmission (6) such that the second prime mover (4) is directly operatively connected to the second input shaft (8) of the second sub-transmission (6).

4. The transmission of claim 1, wherein the second prime mover (4) is indirectly coupleable to the second input shaft (8) of the second sub-transmission (6) such that the second prime mover (4) is indirectly operatively connected to the second input shaft (8) of the second sub-transmission (6).

5. The transmission of claim 1, further comprising a further shift element (G) associated with the planetary transmission, the further shift element (G) operable for setting a speed superimposition mode at the planetary transmission for the first prime mover (3) and the second prime mover (4), the first prime mover (3) coupled to the sun gear (24) of the planetary transmission in the speed superimposition mode, the second prime mover (4) coupled to the ring gear (22) of the planetary transmission in the speed superimposition mode, the carrier (23) of the planetary transmission coupled to the output shaft (9) in the speed superimposition mode.

6. The transmission of claim 1, further comprising a third prime mover (27) configured as an electric machine, the third prime mover (27) operatively connected to the first input shaft (7).

7. The transmission of claim 1, further comprising a separating clutch (KO) associated with the first input shaft (7) for the selectively connecting the first prime mover (3) to the first input shaft (7).

8. The transmission of claim 7, wherein separating clutch (KO) is configured as a form-locking separating clutch or as a friction-locking separating clutch.

9. A transmission system of a motor vehicle, comprising:
the transmission (2) of claim 1;
a first prime mover (3) coupled to the first input shaft (7);
a second prime mover (4) coupled to the second input shaft (8); and
a drive output (11) coupled to the first output shaft (9) and to the second output shaft (10).

* * * * *